US009142005B2

(12) United States Patent
Lukyanov et al.

(10) Patent No.: US 9,142,005 B2
(45) Date of Patent: Sep. 22, 2015

(54) EFFICIENT PLACEMENT OF TEXTURE BARRIER INSTRUCTIONS

(75) Inventors: Maxim Lukyanov, Sunnyvale, CA (US); Boris Beylin, Palo Alto, CA (US); Robert Steven Glanville, Cupertino, CA (US); Alexander Grosul, Santa Clara, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 265 days.

(21) Appl. No.: 13/590,075

(22) Filed: Aug. 20, 2012

(65) Prior Publication Data
US 2014/0049549 A1 Feb. 20, 2014

(51) Int. Cl.
*G06T 1/00* (2006.01)
*G06T 1/60* (2006.01)

(52) U.S. Cl.
CPC .................................. *G06T 1/60* (2013.01)

(58) Field of Classification Search
None
See application file for complete search history.

(56) References Cited

U.S. PATENT DOCUMENTS

2009/0259997 A1* 10/2009 Grover et al. ................. 717/136
2012/0304194 A1* 11/2012 Engh-Halstevdt et al. ... 718/106

* cited by examiner

*Primary Examiner* — Phi Hoang
*Assistant Examiner* — Mohammad H Akhavannik
(74) *Attorney, Agent, or Firm* — Artegis Law Group, LLP

(57) ABSTRACT

One embodiment of the present invention sets forth a technique for placing texture barrier instructions within a thread program to advantageously enable efficient and correct operation of the thread program. A thread program compiler statically determines a pending request count needed to progress beyond a particular texture barrier instruction, which blocks execution of subsequent instructions that depend on previously requested data. Each instance of the thread program blocks execution at the barrier instruction until a pending request count condition is satisfied. This technique may advantageously reduce power consumption in a graphics processing unit by eliminating power consumption associated with conventional, generalized scoreboard resources.

21 Claims, 9 Drawing Sheets

EFFICIENT PLACEMENT OF TEXTURE BARRIER INSTRUCTIONS

BACKGROUND OF THE INVENTION

1. Field of the Invention

The present invention generally relates to parallel computation systems and, more specifically, to efficient placement of texture barrier instructions.

2. Description of the Related Art

In conventional computing systems having both a central processing unit (CPU) and a graphics processing unit (GPU), the CPU assigns computational tasks to the GPU and provides the GPU with executable kernels for performing the computational tasks. The CPU may implement a thread program compiler, configured to generate the executable kernels. Each executable kernel includes instructions that the GPU may execute in parallel. Each instance of an executing kernel program is referred to as a thread, and a set of threads is typically organized to execute as a thread group or "warp" or threads. A given computational task performed by the GPU typically comprises a set of multiple threads configured to perform highly parallel operations, such as generating and texturing pixels within an image or sequence of images.

During the course of performing these highly parallel operations, the GPU typically generate multiple memory requests that may remain simultaneously outstanding for significant spans of time. Each thread may generate memory requests in a specific order, and each memory request may require a significant number of machine cycles to complete. Each destination register for a memory request is typically configured to operate in conjunction with a scoreboard circuit, which tracks memory request completion to enforce proper instruction execution semantics regardless of when a particular memory request is actually fulfilled. For example, when a memory read request is generated to a particular address in memory, a target register is named as storage for the data to be read from memory. At the same time, a scoreboard register is configured to wait for the memory read request to be fulfilled before allowing any instructions that use the register to execute.

While scoreboard techniques are known in the art to produce semantically correct results, implementing a scoreboard system to manage large numbers of pending operations destined for a large number of storage registers within a modern GPU requires significant overall die area and power consumption. Power consumption is an important factor in GPU viability for many mobile devices, which rely primarily on battery power for operation. Reducing power consumption in mobile devices enables longer battery life and more efficient design. Power consumption is also an important factor in high-throughput server systems, as power consumption has a direct impact on operating costs and computational density of the server systems.

Accordingly, what is needed in the art is a technique for reducing GPU power consumption in scenarios involving multiple outstanding memory requests.

SUMMARY OF THE INVENTION

One embodiment of the present invention sets forth a computer-implemented method for compiling a thread program. The method includes generating a control flow graph (CFG) that describes the thread program and control flow dependencies among instructions within the thread program, analyzing the CFG to identify a first set of instructions that generate memory requests and a second set of instructions that consume memory requests, and placing a first texture barrier instruction in the thread program based on the control flow dependencies among instructions within the thread program, where an argument for the first texture barrier instruction is based on the first set of instructions and the second set of instructions.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the techniques described herein is that a GPU may provide semantically correct execution over multiple pending memory requests with greater efficiency relative to conventional processing system that implement scoreboard circuitry. Eliminating the need for scoreboard circuitry advantageously reduces overall power consumption for the GPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
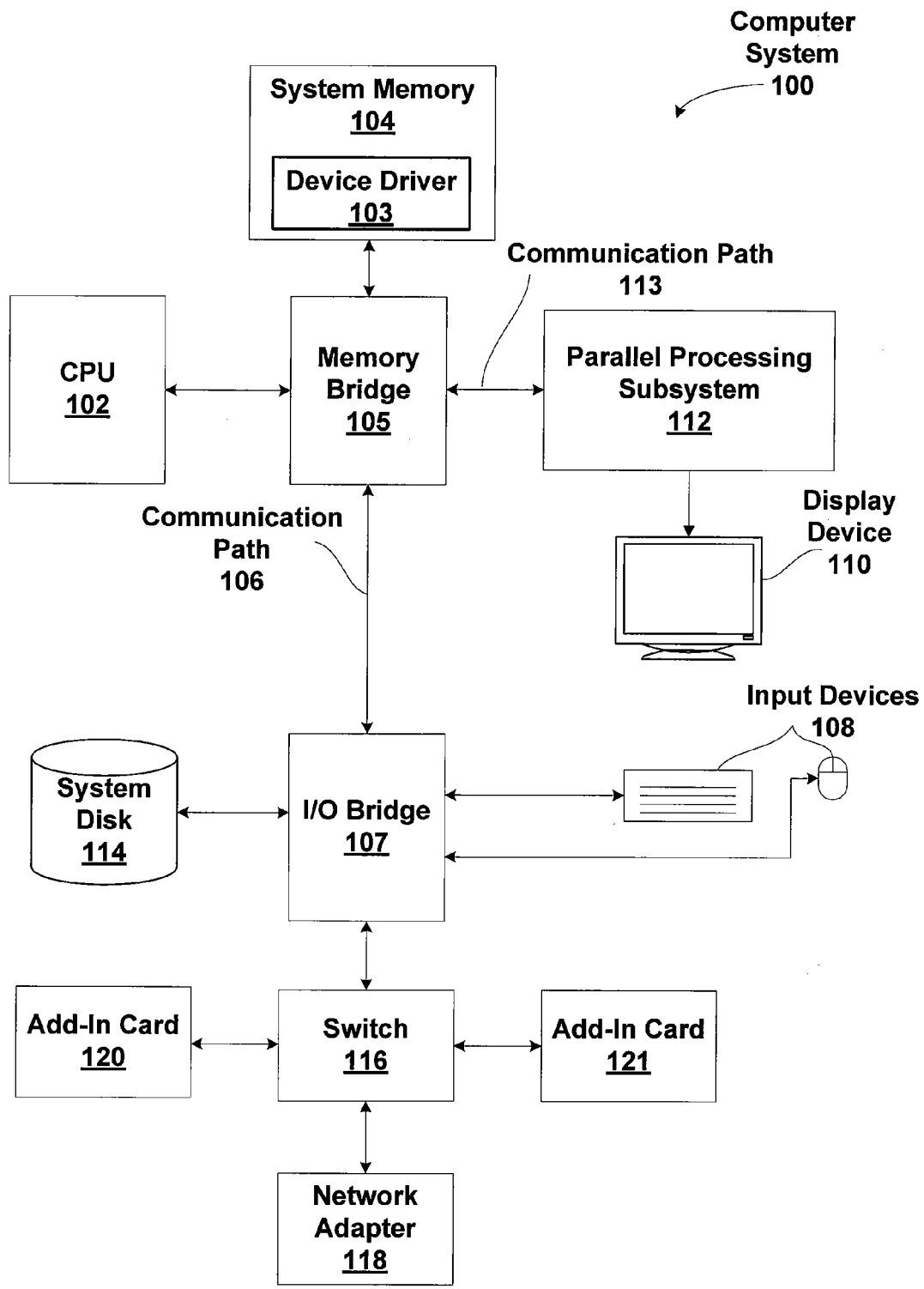
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
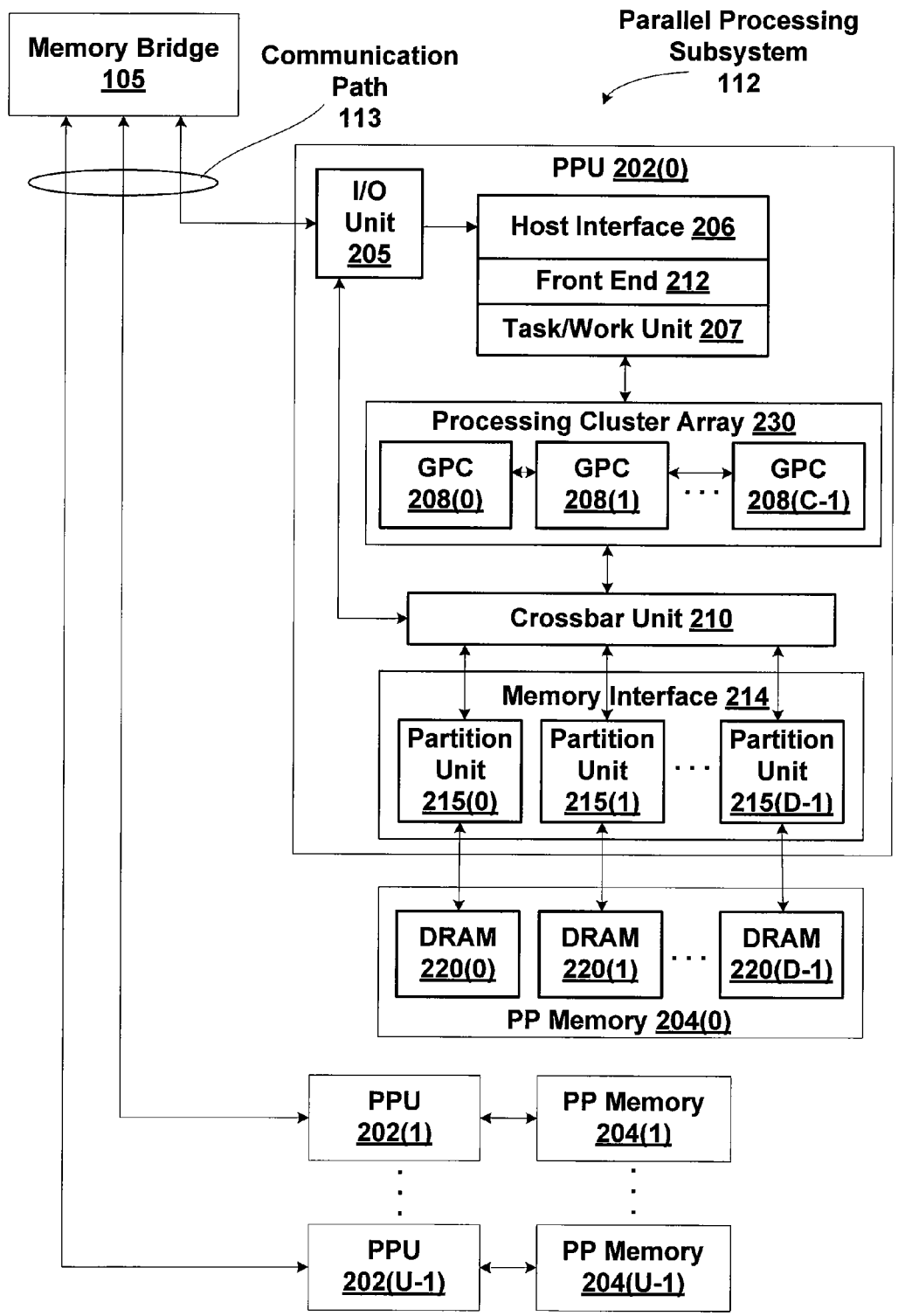
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
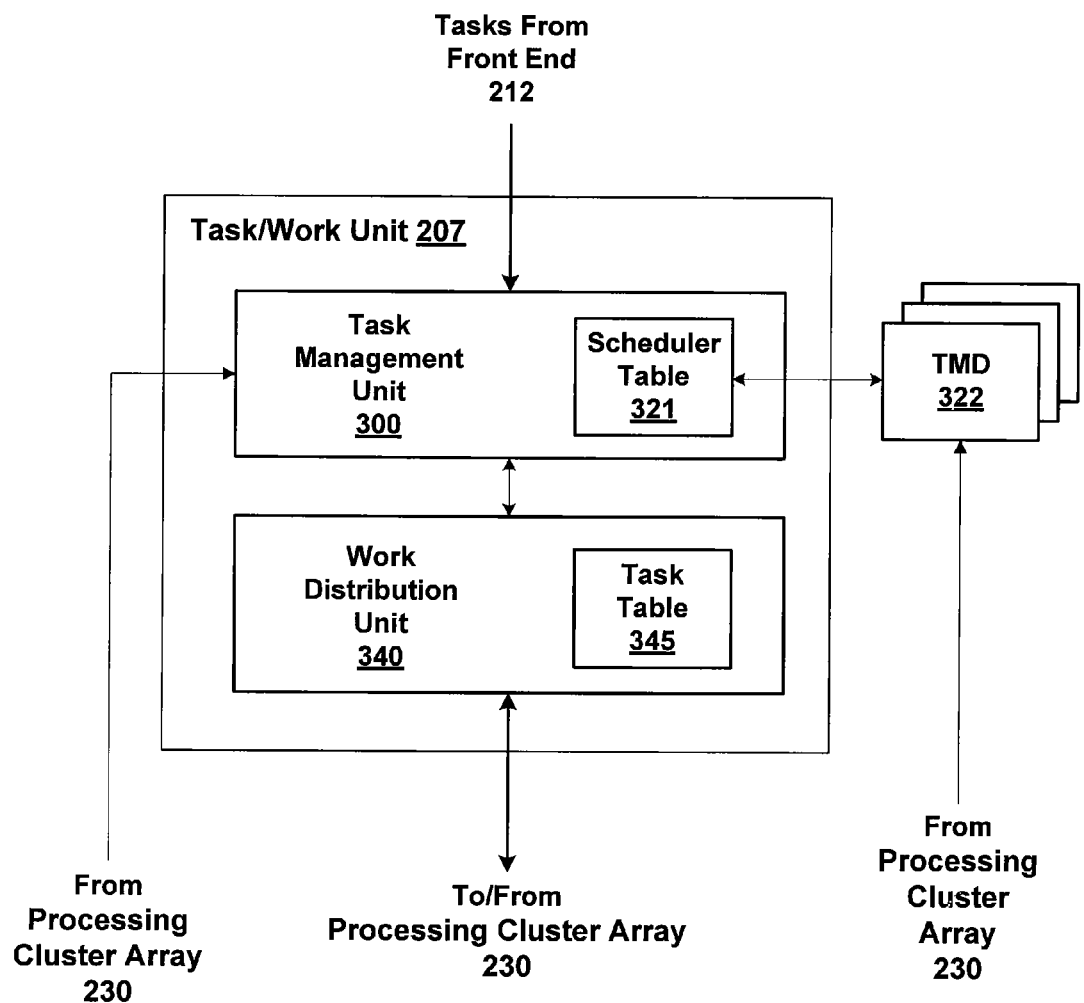
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled (not shown) so that execution of the task will resume at a later time once any dependencies introduced are resolved by subsequently re-presenting the stopped task to the Task Management Unit. When a child processing task is generated, during execution of a task, a pointer to the child task is added to the list of task pointers eligible to be to be scheduled immediately by the Task Management Unit. A child task may be generated by a TMD 322 executing in the processing cluster array 230. In one embodiment, tasks that are stopped at a synchronization barrier are added to a first list of task pointers, while tasks that are created as children are added to a second list of task pointers, distinct from the first list of task pointers. Furthermore, child tasks associated with the second list of task pointers may be executed immediately and with higher priority than tasks associated with the first list of task pointers.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory.

Task Processing Overview

Figure 3B:
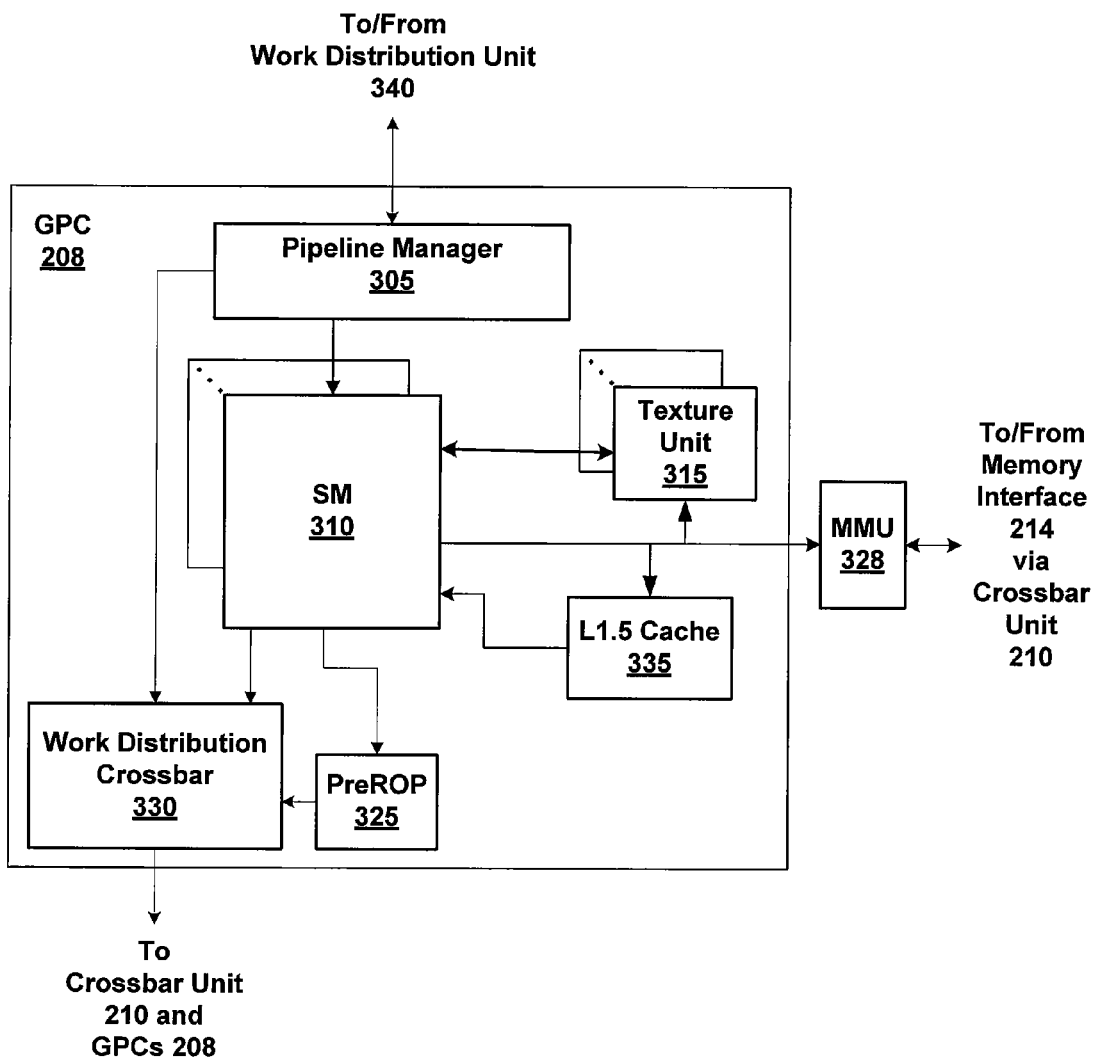
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CIA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
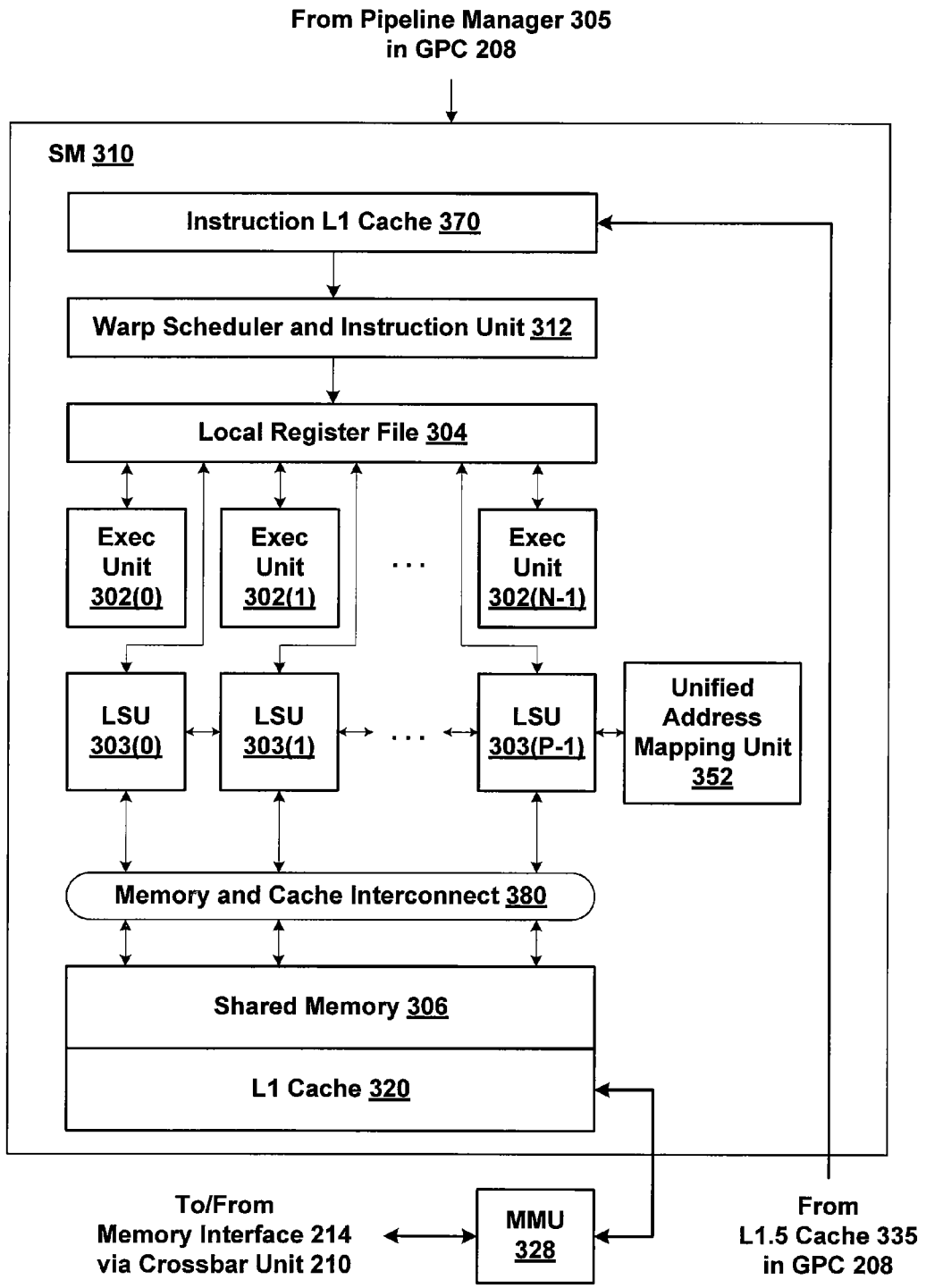
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
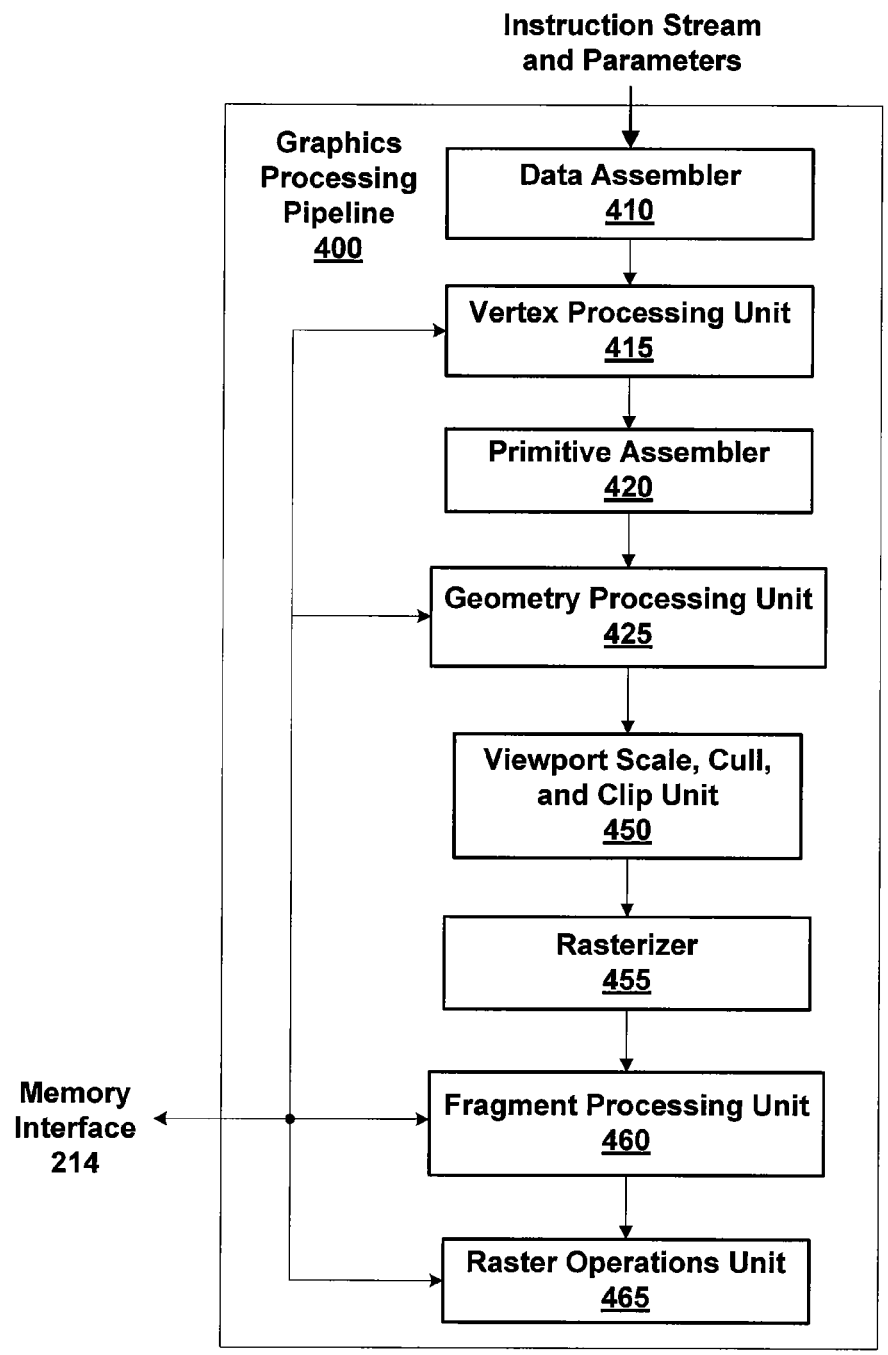
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Placement of Texture Barriers

Embodiments of the present invention specify a technique implemented within a thread program compiler for compiling a thread program to include texture barrier (TEXDEPBAR) instructions positioned within the thread program to preserve semantic correctness of the thread program in systems that may lack a general scoreboard system. In one embodiment, the texture barrier instruction (TEXDEPBAR) is implemented within the SM 310 of FIG. 3B. The TEXDEPBAR instruction establishes an execution barrier that blocks subsequent instructions within a thread program until a number of pending memory requests from the thread program is less than or equal to an immediate argument for the TEXDEPBAR instruction. One exemplary memory request is a texture instruction, such as a texture lookup instruction that may be performed by fragment processing unit 460 of FIG. 4 in order to compute color for a fragment. Proper barrier placement, between a texture lookup instruction and an instruction that depends on data from the texture lookup, is a necessary requirement to guarantee the instruction executes only after texture lookup results are available to be used by the instruction. Without proper placement of the TEXDEPBAR instruction, semantically incorrect execution of the thread program may result.

In one embodiment, each thread within a thread group needs to clear the texture barrier instruction before the any thread within the thread group may advance. In alternative embodiments, each thread may advance independently as conditions for the texture barrier instruction are satisfied.

In addition to proper placement, the immediate argument for the TEXDEPBAR instruction needs to reflect an appropriate value, otherwise system performance may suffer unnecessarily. Determining TEXDEPBAR instruction placement is discussed below. Also discussed is a technique for computing an appropriate value for the immediate argument.

Figure 5A:
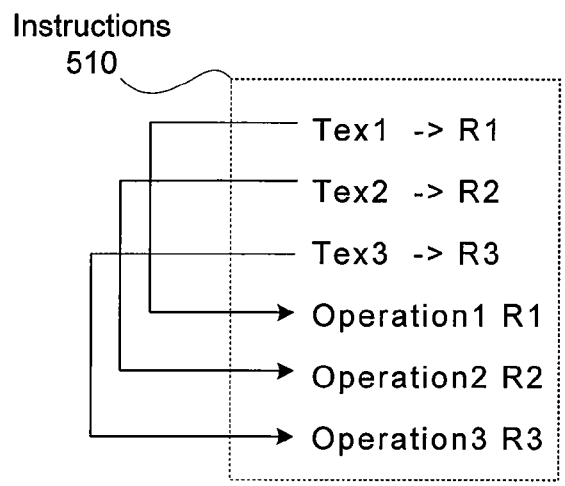
FIG. 5A illustrates a set of instructions within a thread program that access texture data, according to one embodiment of the present invention.

FIG. 5A illustrates a set of instructions 510 within a thread program that access and use texture data, according to one embodiment of the present invention. Texture lookup instructions Tex1, Tex2, and Tex3 initiate separate lookup operations of texture data to be stored in respective registers R1, R2, R3. Operation1 is an instruction that operates on data residing within R1, Operation2 is an instruction that operates on data residing within R2, and Operation3 is an instruction that operates on data residing within R3. Latency to retrieve the texture data prior to storage within a given register may be significant, spanning hundreds or even thousands of instruction cycle times. In conventional systems, a scoreboard circuit begins blocking instructions that depend on R1 in response to instruction Tex1 executing and naming R1 as a target into which results will be stored. To preserve semantic correctness, a conventional scoreboard circuit blocks Operation1 form executing until data for R1 has been successfully read. However, with no scoreboard circuit, semantic correctness is preserved via the TEXDEPBAR instruction being appropriately inserted to generate transformed instructions 520.

Figure 5B:
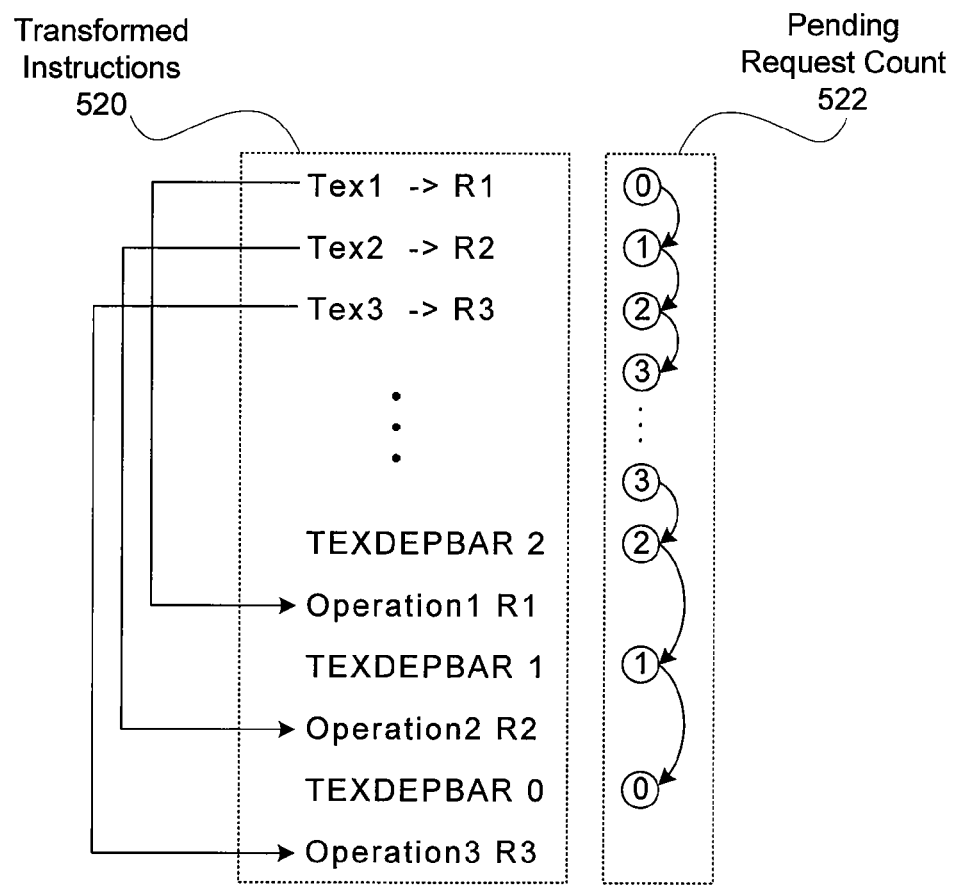
FIG. 5B illustrates a set of transformed instructions that includes texture barrier instructions inserted to preserve semantic correctness, according to one embodiment of the present invention.

FIG. 5B illustrates a set of transformed instructions 520 that includes texture barrier instructions inserted to preserve semantic correctness, according to one embodiment of the present invention. Texture lookup instructions Tex1, Tex2, and Tex3 initiate separate lookup operations of texture data to be stored in respective registers R1, R2, R3. As shown, a pending request count 522 tracks how many pending requests are outstanding. After Tex1 executes, pending request count 522 increments from zero to one. After Tex2 executes, pending request count 522 increments again to two, and so forth.

Operation1 is an instruction that operates on data residing within R1, Operation2 is an instruction that operates on data residing within R2, and Operation3 is an instruction that operates on data residing within R3. As shown, an instance of TEXDEPBAR with immediate argument "2" is inserted just prior to Operation1 to block until pending request count 522 is less than or equal to 2. Regardless of what other requests may have been processed between the Tex3 and Operation1 instructions, pending request count 522 needs to decrement back down to a value of two or less for data to be safely stored within R1 from the Tex1 instruction. The TEXDEPBAR 2 instruction, therefore, guarantees availability of data within R1. Similarly, TEXDEPBAR 1 guarantees availability of data within R2 prior to Operation2 executing, and TEXDEPBAR 0 guarantees availability of data within R3 prior to Operation3 executing.

In one embodiment, the thread program compiler calculates a pending request count for each texture access operation and at each instruction that uses resulting data to determine an immediate argument for a given instance of TEXDEPBAR. A GPU executing the thread program maintains a pending request count that may be incremented for each newly posted memory request and decremented for each fulfilled memory request. When a particular thread executes a TEXDEPBAR instruction, the pending request count is compared to the immediate argument for the TEXDEPBAR to determine whether the thread should block at the TEXDEPBAR instruction or continue. If the thread should block, for example because the immediate argument is not less than or equal to the pending request count, then the thread may be suspended until the pending request count changes value.

Each suspended thread within a thread block may continue to perform a comparison operation against the pending request count until all threads within the thread group satisfy an appropriate continuation condition to continue. Because all threads within a thread group execute substantially identical portions of the thread program at any given time, once all threads reach the TEXDEPBAR instruction, all threads will be waiting for an identical barrier condition. Each time the pending request count changes, only one comparison against the immediate argument needs to be performed to know that all threads within the thread group may continue.

The thread program compiler is able to place TEXDEPBAR instructions based on determining control flow dependence for instructions within a thread program. However, calculating an appropriate immediate argument for each TEXDEPBAR involves additional static analysis of data and flow dependency within the thread program. To facilitate this analysis, the thread program compiler organizes a given thread program into one or more basic blocks, each comprising instructions that may be executed together without explicit branches. At each explicit branch in the thread program, a different basic block may be identified. Instructions for the different basic block may be executed together at a different time. Instructions implementing predicated execution do not necessarily give rise to a new basic block because both paths of a branch implemented using predicated execution may execute together as a single instruction stream.

Figure 6:
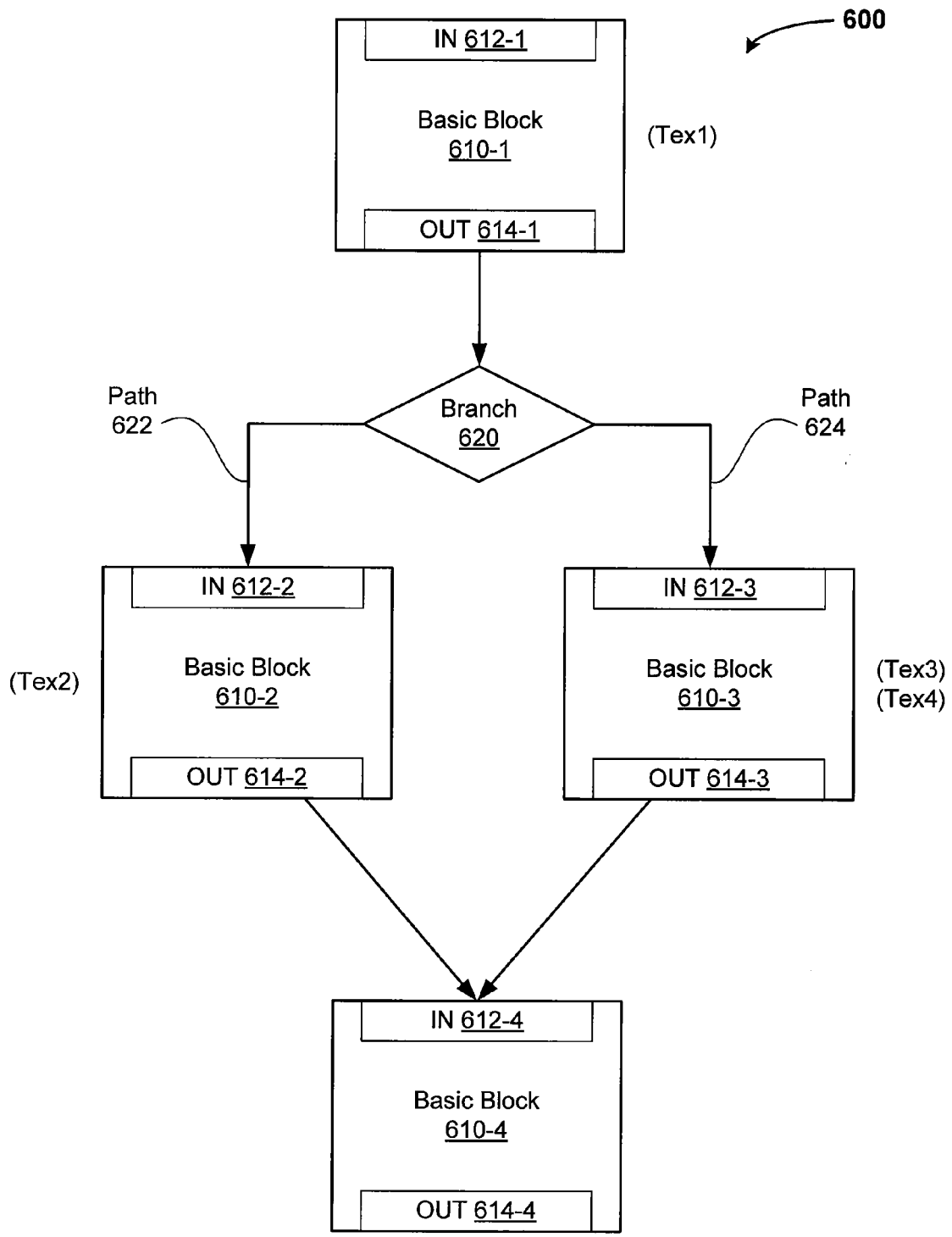
FIG. 6 illustrates a set of basic blocks having pending request counts at entry and exit points, according to one embodiment of the present invention.

FIG. 6 illustrates a set of basic blocks (BBs) 610 having pending request counts at entry and exit points, according to one embodiment of the present invention. In one embodiment, the thread program compiler analyzes a GPU program to generate a control flow graph (CFG), such as CFG 600, comprising BBs 610. Any technically feasible technique may be implemented to generate CFG 600, and any technically feasible technique may be used to model the CFG without departing the scope and spirit of the present invention.

In this example, BBs 610 may be used to model and organize execution flow for a thread program. For example, BB 610-1 may include initial operations performed by the thread program, and a branch 620 operation models an "if-then" construct to indicate that execution may branch to either path 622 or path 624 within the thread program. Either BB 610-2 executes if path 622 is taken, or BB 610-3 executes if path 624 is taken. Execution converges in BB 610-4. In one embodiment, each BB 610 is sequentially executed by SM 310 so that only substantially identical code is executing within SM 310 at any one time. Results from executing the different paths 622, 624 are saved for potential processing in BB 610-4.

Each BB 610 may include instructions that post memory requests and other instructions that process data based on the memory requests. Each BB 610 includes a pending request count at block entry, IN 612, and a pending request count at block exit, OUT 614. Pending request count at IN 612 indicates how many pending requests were generated in upstream portions of the CFG, while pending request count at OUT 614 indicates a net change in pending request count within the BB.

For example, consider a scenario where BB 610-1 includes one texture lookup instruction (Tex1), BB 610-2 includes one texture lookup instruction (Tex2), and BB 610-3 includes two texture lookup instructions (Tex3, Tex4). In this example IN 612-1 would be set to invalid (infinity) because there is no dependency within BB 610-1 and OUT 614-1 would be one (1). Because OUT 614-1 is set to one, both IN 612-2 and IN 612-3 would also be set to one. Path 622 passes through BB 610-2, which includes one more texture lookup instruction (Tex2), so OUT 614-2 would be set to two (2). Path 624 passes through BB 610-3, which includes two more texture lookup instructions (Tex3, Tex4), so OUT 614-3 would be set to three (3). IN 612-4 needs to indicate a pending request count that will yield correct execution semantics, and therefore is conservatively set to the minimum of OUT 614-2 and OUT 614-3. In this case, IN 612-4 is set to two. In general, embodiments of the present invention select a minimum of exit pending request counts at each convergence point in a CFG.

In one embodiment, the thread program compiler performs a local placement of each TEXDEPBAR by scanning linearly through each BB from top to bottom. Assuming analysis takes place in physical register space, a per-register scoreboard is kept within the thread program compiler state. At any given point during the scan, each entry in the scoreboard contains an updated integer value denoting the number of outstanding texture requests performed on the path from a texturing operation where that register had been used as a write-back to the current point of the scan. In other words, when scanning the Nth instruction in a block, an Mth scoreboard entry reflects how many texture operations have happened since register 'm' had been used as a texture write-back.

Initially, every scoreboard entry is set to not valid (equals ∞). Every time a texturing operation TexN is encountered, a corresponding scoreboard register, R, is updated as follows in Equation 1:

$$\text{Scoreboard}[R] = \begin{cases} x = 0, & R \in \text{TexWritebacks} \\ x \mathrel{+}= 1, & R \notin \text{TexWritebacks} \land \text{Scoreboard}[R] \neq \infty \\ x = \infty, & R \notin \text{TexWritebacks} \land \text{Scoreboard}[R] = \infty \end{cases} \quad (1)$$

Here, TexWritebacks={R|R∈Outputs(Tex)}.

While visiting every instruction within the BB and updating scoreboard registers, each instruction's operands must be checked for dependencies on outstanding texture requests. If any instruction depends on a texture access, a TEXDEPBAR should be placed before the dependent instruction. Effectively, if a register R, that is used (read or written) by a current instruction at position i in a block, has been used as a write-back by a texturing operation at position {t|t<i}, a TEXDEPBAR with some argument N must be placed before instruction i to block issuing the instruction until the texture at position t completes and results are available. A TEXDEPBAR argument N is computed as follows in Equation 2:

$$N = \min_{R \in Opnds(i)}(\text{Scoreboard}[R]) \quad (2)$$

By obtaining a minimum scoreboard entry corresponding to either register operand of an instruction, a stall is enforced that blocks execution until the lexicographically closest texture operation upon which the instruction depends is able to complete. Textures always complete in-order and instructions in a basic block always execute in-order.

After a barrier is crossed during execution, {M|M=|Queue|−N} corresponding texturing operations will have been completed. Here, 'Queue' denotes a size of a queue of pending texture access requests. Consequently, after issuing a TEXDEPBAR, every entry in the scoreboard has to be updated by subtracting M from each non-infinity entry. All ∞ entries should be skipped, while all negative values should be clamped to ∞, as expressed below in Equation 3:

$$\text{Scoreboard}[R] = \begin{cases} x, & x - M > 0 \land x \neq \infty \\ \infty, & x = \infty \lor x - M \leq 0 \end{cases} \quad (3)$$

The thread program compiler processes each instruction within a given BB according to the principles set forth above. In one embodiment only local placement is used, and each pending request count at exit is set to zero. That is, each BB includes a TEXDEPBAR 0 instruction that is placed as a final instruction. This approach does not necessarily yield highest possible overall performance, but does yield semantically correct execution. In other embodiments, the thread program compiler also performs global placement for higher overall performance.

When an outstanding texture count for a scoreboard entry at the end of a block is non-zero, i.e. there is a texturing operation whose dependent instructions are in other blocks, those blocks need to be supplied with accumulated information on how many textures have been queued previously.

Propagating data about individual blocks to be used in a global solution involves solving a forward dataflow analysis problem, as discussed below.

A pending texture count for every path from a texture request to each dependent instruction is calculated, picking conservative counts by selecting a minimum count at confluence points. Propagating a minimum pending texture count from predecessor BBs ensures semantically correct execution. This technique is described below in the equations 4 and 5:

$$IN(B)_{B \in Blocks} = \min_{P \in Prsdscessors(B)}(OUT(P)) \quad (4)$$

$$OUT(B)_{B \in Blocks} = GEN(B) \oplus (IN(B) \ominus KILL(B)) \quad (5)$$

Here, IN(B) and OUT(B) are scoreboard states at the beginning and the end of a given basic block B. GEN(B) is a scoreboard state, where each valid n(on-infinite) entry corresponds to a texturing operation in the block that writes a register corresponding to that entry and should not be stalled in this block (the write has dependent operations elsewhere in the flow graph). KILL(B) collects everything that has been referenced and not generated in basic block B.

One key difference between the disclosed approach and more conventional dataflow algorithms is the usage and computation of the KILL(B) set. Entries in a KILL(B) set depend on a corresponding dynamic IN(B) and are not populated immediately when computed. Instead, the entries are short-circuited, by a unique value, to indicate that an entry is being killed in the BB. Real values are substituted within an iterative solution every time equations are being applied. Operator θ is defined as follows in Equations 6-8:

$$MaxKilled = \max_{R \in Scoreboard}(\{IN(B)_R \mid IN(B)_R \neq \infty \wedge KILL(B)_R \neq \infty\}) \quad (6)$$

$$IN(B)_R \ominus KILL(B)_R = \begin{cases} x = IN(B)_R - MaxKilled, IN(B)_R \neq \infty \wedge x > 0 \\ \infty, IN(B)_R = \infty \vee IN(B)_R - MaxKilled \leq 0 \end{cases} \quad (7)$$

$$IN\_KILLED(B) = \bigcup_{R \in Scoreboard} IN(B)_R \ominus KILL(B)_R \quad (8)$$

After applying the KILL(B) operation on incoming data, GEN(B) values are added to intermediate results to introduce newly generated information into the flow. The OUT(B) operation is computed via operator ⊕ as shown below in Equations 9-11:

$$MaxLiveAfterKill = \quad (9)$$
$$\max_{R \in Scoreboard}(\{IN\_KILLED(B)_R \mid IN\_KILLED(B)_R \neq \infty\})$$

$$GEN(B)_R \oplus IN\_KILLED(B)_R = \quad (10)$$
$$\begin{cases} x = GEN(B)_R + MaxLiveAfterKill, GEN(B)_R \neq \infty \\ x = IN\_KILLED(B)_R, GEN(B)_R = \infty \end{cases}$$

$$OUT(B) = \bigcup_{R \in Scoreboard} GEN(B)_R \oplus IN\_KILLED(B)_R \quad (11)$$

After IN sets for each block have been computed, a local TEXDEPBAR placement algorithm proceeds as described above, except initial scoreboard state for each block is initialized to be that block's value for IN 612.

By performing texture barrier placement globally (as opposed to just locally), significant performance improvement may be achieved with respect to certain common shaders functions implemented within the fragment processing unit 460 of FIG. 4. Persons skilled in the art will recognize that any fragment shader that includes texture operations with results consumed in different basic blocks will benefit from the techniques taught herein.

Figure 7:
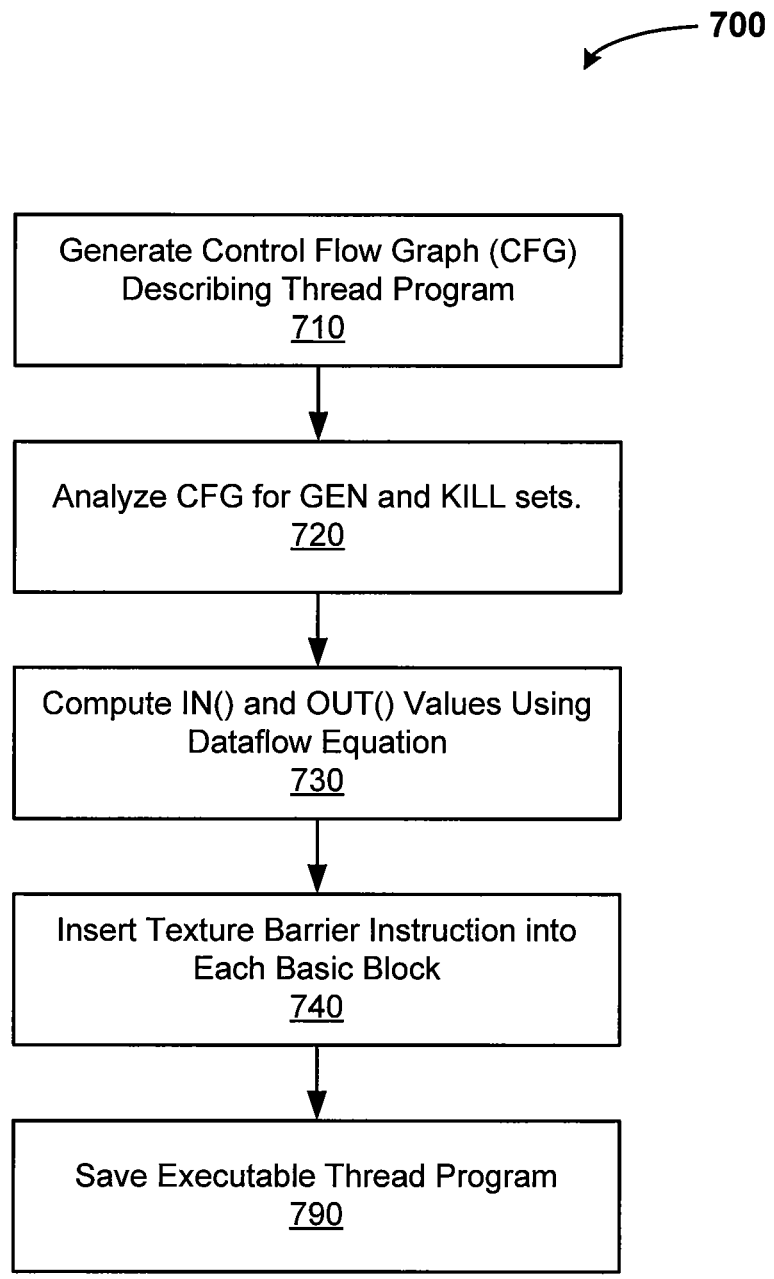
FIG. 7 is a flow diagram of method steps for placing texture barrier instructions into a thread program based on global dependencies, according to one embodiment of the present invention.

FIG. 7 is a flow diagram of method 700 for placing texture barrier instructions in a thread program based on global dependencies, according to one embodiment of the present invention. Although the method steps are described in conjunction with the systems of FIGS. 1-4, persons of ordinary skill in the art will understand that any system configured to perform the method steps, in any order, is within the scope of the present invention.

Method 700 begins in step 710, where the thread program compiler generates a control flow graph (CFG) describing a target thread program in terms of control flow and data dependencies of each instruction within the target program. The thread program compiler partitions the target thread program into one or more basic blocks. In one embodiment, the thread program compiler executes on CPU 102 of FIG. 1. In step 720, the thread program compiler analyzes the CFG for GEN and KILL sets, as described above in FIG. 6. A GEN set includes instructions that generate new memory requests, while a KILL set includes instructions that consume memory request results. In step 730, the thread program compiler computes IN( ) and OUT( ) values using data flow Equations set forth above in Equations 4 and 5. In step 740, the thread program compiler inserts at least one texture barrier instruction, including an immediate argument, into each basic block comprising the thread program.

In one embodiment, a texture barrier instruction is inserted as a final instruction in each basic block, and additional texture barrier instructions are inserted within the basic block prior to instructions that depend on pending access requests. Texture barrier instructions are inserted within the basic block by scanning the basic block from beginning to end, and inserting a texture barrier instruction prior to each basic block program instruction that depends on previously requested data. A value for the immediate argument associated with the texture barrier instruction is calculated based on a count of accumulated memory access requests along a control dependency path that includes the program instruction.

The method terminates in step 790, where the thread program compiler saves an executable thread program based on the target thread program and inserted texture barrier instructions. In one embodiment, the thread program compiler resides within the device driver 103 and saves the executable thread program to the parallel processing subsystem 112 for immediate execution. In a different embodiment, the thread program compiler executes as part of a user application and saves the executable thread program to system memory 104 or system disk 114 for later execution.

In sum, a technique for placing texture barrier instructions within a thread program for execution efficiency and semantic correctness is disclosed. The texture barrier instruction blocks execution until data needed by a subsequent instruction within the thread becomes available. A texture program compiler performs a static analysis of the thread program to determine where one or more texture barrier instructions should be inserted. The thread program compiler partitions the thread program into basic blocks for analysis and generates a control flow graph relating control dependencies for each instruction within the basic blocks. A count of pending memory requests is calculated along each path of the control flow graph. Along each path, access requests for texture, or any other in-order memory access, may add to a pending request count, while instructions that consume data from previous access requests reduce the pending request count along the path. At each instruction within a basic block that depends on a previous texture request, a texture barrier instruction may be added. At certain exit points from a basic block, a texture barrier may also be added.

One advantage of the techniques described herein is that a GPU may provide semantically correct execution over multiple pending memory requests with greater efficiency than conventional processing systems based on scoreboard circuitry. Eliminating the need for scoreboard circuitry advantageously reduces overall power consumption for the GPU.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

In view of the foregoing, the scope of embodiments of the present invention is defined by the claims that follow.

The invention claimed is:

1. A computer-implemented method for compiling a thread program, the method comprising:
    generating a control flow graph (CFG) that describes control flow dependencies among instructions within the thread program;
    analyzing the CFG to identify a first set of instructions that generate memory requests and a second set of instructions that consume memory request results; and
    placing a first texture barrier instruction in the thread program based on the control flow dependencies among the instructions within the thread program, wherein an argument associated with the first texture barrier instruction is based on the first set of instructions and the second set of instructions.

2. The method of claim 1, further comprising:
    computing an input value and an output value for a basic block within the thread program based on the first set of instructions and the second set of instructions; and
    placing a second texture barrier instruction within the basic block based on an output value associated with the basic block.

3. The method of claim 2, wherein the second texture barrier instruction is placed as a final instruction within the basic block.

4. The method of claim 2, wherein an argument associated with the second texture barrier is based on the input value, the first set of instructions, and the second set of instructions.

5. The method of claim 2, wherein computing the input value comprises calculating a minimum value from at least two output values associated with upstream basic blocks.

6. The method of claim 2, wherein computing the output value comprises adding the input value to an accumulation of data request operations and data consumption operations.

7. The method of claim 2, wherein the argument associated with the first texture barrier instruction is calculated based on the input value and an accumulation of data request operations and data consumption operations between an initial instruction within the basic block and the first texture barrier instruction.

8. The method of claim 1, wherein placing the first texture barrier instruction comprises:
    scanning a basic block of the thread program for a program instruction that depends on previously-requested data; and
    inserting the first texture barrier instruction within an instruction stream of the basic block prior to the program instruction in an execution order.

9. The method of claim 1, wherein the memory requests comprise texture lookup requests that are serviced in-order.

10. A non-transitory computer-readable medium including instructions that, when executed by a processing unit, cause the processing unit to compile a thread program, by performing the steps of:
    generating a control flow graph (CFG) that describes control flow dependencies among instructions within the thread program;
    analyzing the CFG to identify a first set of instructions that generate memory requests and a second set of instructions that consume memory request results; and
    placing a first texture barrier instruction in the thread program based on the control flow dependencies among the instructions within the thread program, wherein an argument associated with the first texture barrier instruction is based on the first set of instructions and the second set of instructions.

11. The non-transitory computer-readable medium of claim 10, further comprising:
    computing an input value and an output value for a basic block within the thread program based on the first set of instructions and the second set of instructions; and
    placing a second texture barrier instruction within the basic block based on an output value associated with the basic block.

12. The non-transitory computer-readable medium of claim 11, wherein the second texture barrier instruction is placed as a final instruction within the basic block.

13. The non-transitory computer-readable medium of claim 11, wherein an argument associated with the second texture barrier is based on the input value, the first set of instructions, and the second set of instructions.

14. The non-transitory computer-readable medium of claim 11, wherein computing the input value comprises calculating a minimum value from at least two output values associated with upstream basic blocks.

15. The non-transitory computer-readable medium of claim 11, wherein computing the output value comprises adding the input value to an accumulation of data request operations and data consumption operations.

16. The non-transitory computer-readable medium of claim 11, wherein the argument associated with the first texture barrier instruction is calculated based on the input value and an accumulation of data request operations and data consumption operations between an initial instruction within the basic block and the first texture barrier instruction.

17. The non-transitory computer-readable medium of claim 10, wherein placing the first texture barrier instruction comprises:

scanning a basic block of the thread program for a program instruction that depends on previously-requested data; and inserting the first texture barrier instruction within an instruction stream of the basic block prior to the program instruction in an execution order.

18. The non-transitory computer-readable medium of claim 10, wherein the memory requests comprise texture lookup requests that are serviced in-order.

19. A computing device, comprising:
a graphics processing unit configured to execute an executable kernel; and
a processing unit coupled to the graphics processing unit and configured to:
generate a control flow graph (CFG) that describes control flow dependencies among instructions within the thread program;
analyze the CFG to identify a first set of instructions that generate memory requests and a second set of instructions that consume memory request results;
place a first texture barrier instruction in the thread program based on the control flow dependencies among the instructions within the thread program;
compute an input value and an output value for a basic block within the thread program based on the first set of instructions and the second set of instructions;
place a second texture barrier instruction within the basic block based on the output value for the basic block; and
transmit the executable kernel to the graphics processing unit, wherein the executable kernel is based on the texture program and includes the first texture barrier instruction and the second texture barrier instruction,
wherein an argument associated with the first texture barrier instruction is based on the first set of instructions and the second set of instructions, and
wherein the memory requests comprise texture lookup requests that are serviced in-order.

20. The computing device of claim 19, wherein the first texture barrier instruction causes a thread processor within the graphics processing unit to block execution of the thread program until a number of pending memory requests associated with the thread processor is less than or equal to an argument associated with the first texture barrier instruction.

21. The method of claim 1, wherein the argument associated with the first texture barrier instruction is based on a number of accumulated memory requests associated with the thread program.

* * * * *